United States Patent
Valentinsson et al.

(10) Patent No.: US 6,676,790 B1
(45) Date of Patent: Jan. 13, 2004

(54) PROCESS FOR THE MANUFACTURING OF A LOAD CARRIER

(75) Inventors: Anders Valentinsson, Färlöv (SE); Rasmus Varfeldt, Helsingborg (SE); Bengt Grönwall, Perstorp (SE)

(73) Assignee: Arca Systems AB, Perstorp (SE)

( * ) Notice: Subject to any disclaimer, the term of this patent is extended or adjusted under 35 U.S.C. 154(b) by 0 days.

(21) Appl. No.: 09/857,776

(22) PCT Filed: Nov. 19, 1999

(86) PCT No.: PCT/SE99/02124
§ 371 (c)(1),
(2), (4) Date: Aug. 21, 2001

(87) PCT Pub. No.: WO00/35658
PCT Pub. Date: Jun. 22, 2000

(30) Foreign Application Priority Data

Dec. 11, 1998 (SE) .................................................. 9804288

(51) Int. Cl.⁷ .......................... B65D 19/18; B65D 19/32; B29B 11/04
(52) U.S. Cl. ............. 156/182; 156/244.13; 156/244.24; 156/245; 108/57.27
(58) Field of Search .......................... 156/182, 84, 242, 156/244.11, 244.13, 244.24, 245, 292, 304.2, 308.2; 108/57.27, 901

(56) References Cited

U.S. PATENT DOCUMENTS 5,255,613 A    10/1993  Shuert

FOREIGN PATENT DOCUMENTS

| DE | 2041624 | 7/1974 |
| SE | 508870 | 11/1998 |
| SE | 508874 | 11/1998 |

*Primary Examiner*—Michael W. Ball
*Assistant Examiner*—Barbara J Musser
(74) *Attorney, Agent, or Firm*—Stevens, Davis, Miller & Mosher, L.L.P.

(57) ABSTRACT

A process for the manufacturing of non-reinforced load carriers (1) of thermoplastic material. Sheet-shaped work pieces (2) and extended bar sections (3) are manufactured by means of an extruder. The work pieces (2) and bar sections (3) are allowed to cool and post-shrink after the manufacturing. An upper and a lower deck member (11 and 12 respectively) are molded in a number of molds comprising mold halves. A first mold contains shaping cavities being a negative representation of the upper deck member (11). A second mold gives shape to a lower deck member (12). The work pieces (2) are molded against each one cavity by means of vacuum and are pressed together while still hot whereby a hollow unit is formed. Skids (3') are molded in a similar way. The parts are allowed to cool and post-shrink whereupon they are joined with each other via a number of joining areas (10).

16 Claims, 1 Drawing Sheet

PROCESS FOR THE MANUFACTURING OF A LOAD CARRIER

CROSS REFERENCE TO RELATED APPLICATIONS

Figure 1:
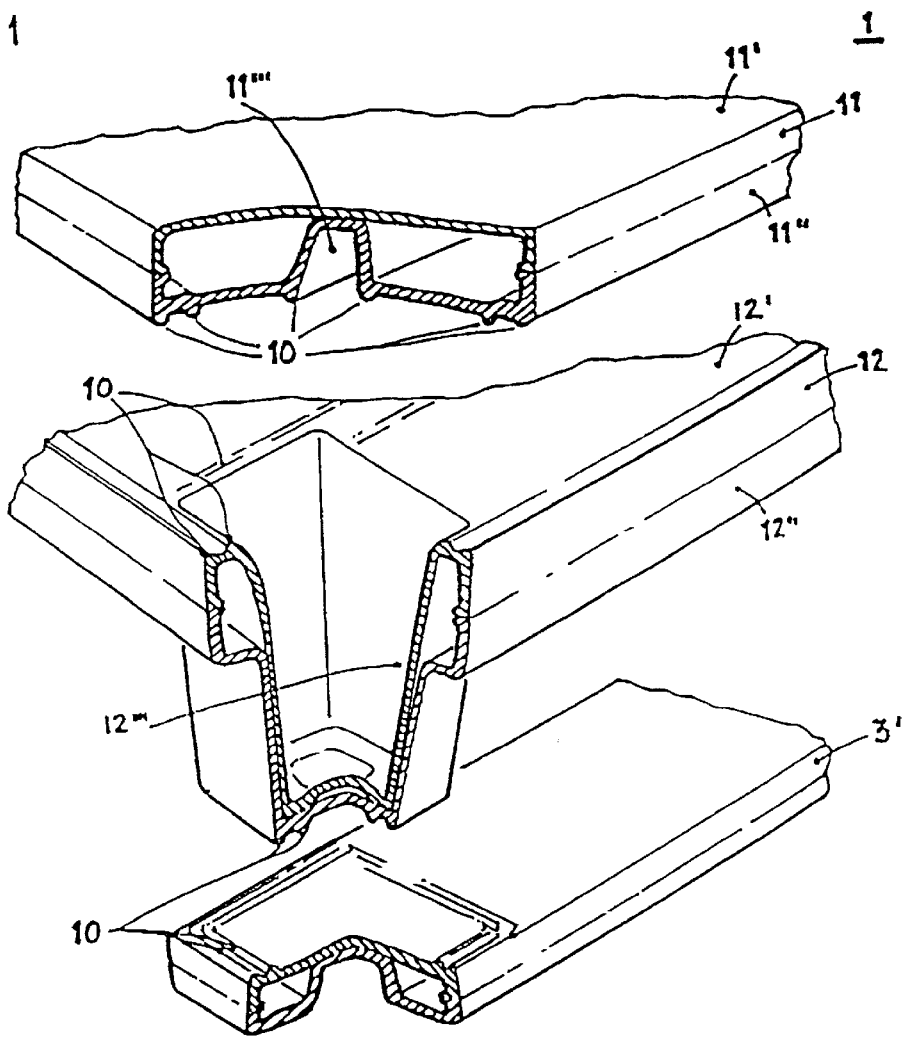

This application has been filed under 35 USC §371, claiming priority from PCT/SE99/02124, having been filed on Nov. 19,1999.

The present invention is related to a process for the manufacturing of non-reinforced load carriers of thermoplastic material.

Thermoplastic products are used in many different areas. These products can be achieved through a number of different manufacturing methods, the most commonly present being injection moulding, vacuum moulding, blow moulding and press moulding.

There is a desire to achieve high load absorption capacity within certain areas. Carrying structures made of materials such as concrete and steel will be able to withstand substantially the same load, independent of temperature and time. This is not the case with thermoplastic materials where a relatively light load might cause a remaining deformation at extended exposure. This phenomena is called creep Strain or cold flow. A structure made of thermoplastic material will however be able to cope with loads that are tens of times higher at shorter times, without any remaining deformation The amount of cold flow in respect of time and temperature is depending on thermoplastic material type and quality.

Load carrying thermoplastic products will most often have to be designed for the most unfavourable load i.e. longest time and highest temperature it might be exposed to during its useful life. It is, however, possible to reduce the amount of cold flow by adding fillers or reinforcing fibres to the thermoplastic material. Common fillers are usually minerals such as lime or mica while reinforcing materials usually comprises glass fibre, steel fibre or carbon fibre. It is also possible to reinforce a thermoplastic product by integrating a metal design in the product. This may for example be constituted of a metal rod placed in a hollow chamber intended for the purpose. Such additives will, however, deteriorate other desired properties the thermoplastic material, by nature, is provided with. One such property is that most thermoplastic materials are easy to keep clean and hygienic. This property will be lost when fillers are added. It will furthermore be impossible, or at least very difficult, to recover the material, both in cases where reinforcing bars and where fillers are used. Recycling of thermoplastic materials are almost mandatory nowadays.

It has, through the present invention, quite unexpectedly, been made possible to achieve non-reinforced load carriers of thermoplastic material with a very high resistance towards cold flow. Non-reinforced means that the load carriers are free from reinforcing additives such as various forms of fibres added to the thermoplastic material and also free from reinforcing profiles, beams or bars made of a material not compatible with the material of the load carrier. Other reinforcements such as material elevations or profiles made of the same material as the load carrier itself may of course occur. The invention relates to a process for the manufacturing of non-reinforced load carriers of thermoplastic material. The process comprises the steps extrusion, vacuum moulding and/or blow moulding of a thermoplastic material such as polyethylene, polypropylene or polybutene. The invention is characterised in that;

a, i) Work pieces in the shape of sheets are manufactured by means of an extruder. The work pieces are allowed to cool and post shrink uniformly c after the manufacturing, suitably by an intermediate storing of 6–48 hours.

a, ii) Extended bar sections with a preferably rectangular or polygonal cross-section are also manufactured by means of an extruder The bar sections are allowed to cool and post shrink uniformly after the manufacturing, suitably by an intermediate storing of 6–48 hours.

b, i) An upper deck member is then manufactured by heating and then moulding two of the uniformly post shrinked work pieces in a first mould comprising a first and a second mould half. The mould halves comprises one shaping cavity each. The two shaping cavities are together, a negative representation of an upper deck member to a load carrier. The mould halves are arranged so that an intermediate space is formed between them and so that the cavities are facing each other. The two heated work pieces are hereby placed in the intermediate space between the two cavities after which they are moulded in each one cavity under influence of vacuum and/or pressure. The mould halves are then pressed together while the thermoplastic material is still hot so that the two work pieces are welded with each other and forms a hollow unit. The thermoplastic material is then allowed to cool somewhat before the mould is opened, the upper deck member is removed and the process can be repeated.

b, ii) A lower deck member is also manufactured by heating and then moulding two further, also uniformly post-shrinked, work pieces which after heating is formed in a second mould comprising a first and a second mould half The mould halves each comprises one shaping cavity, which cavities together is a negative representation of a lower deck member to a load carrier. The two heated work pieces are hereby placed, moulded, welded and removed in a manner similar to the manufacturing of the upper deck member.

b, iii) A skid is possibly also manufactured by heating and then moulding two of the extended bar sections in a third mould comprising a first and a second mould half comprising a first and a second mould half, which mould halves each comprises one shaping cavity, which two cavities together is a negative representation of a skid to a load carrier. The two heated bar sections are hereby placed, moulded, welded and removed in a manner similar to the manufacturing of the deck members.

c) The upper and the lower deck member and the possible skid are then allowed to cool and post shrink uniformly, after being removed from the mould, suitably by an intermediate storing of 6–24 hours.

d) A number of joining surfaces on the lower side of upper deck member, on the upper and lower side of the lower deck member and on the upper side of two or three bar sections or alternatively two or three skids, are then joined with each other. The surfaces are, in one or more steps, heated by means of infrared heating, laser or by being pressed against a heated weld core. The different parts are, in one or more steps, pressed together so that the molten thermoplastic material in the lower joining surfaces of the upper deck member and on the upper and lower joining surfaces of the lower deck member as well as the joining surfaces of the bar sections or the skids weld or melt joins. The thermoplastic material in the joining surfaces is then allowed to cool and solidify at least partly before the pressing is discontinued. A joined, non-reinforced load carrier of thermoplastic material is hereby achieved.

The sheet shaped work pieces are suitably oriented so that the direction of the extrusion coincides between the layers that forms the upper and lower deck members. The reason to this is that the contraction of the thermoplastic material is depending on the direction of the polymer chains These polymer chains will be oriented during the extrusion process. Even if the main part of the contraction will take place within a couple of days, some additional contraction will occur during the main part of the useful life of the product. This contraction will be accelerated when the product is exposed to increased temperatures, such as for example during washing and drying. This contraction might cause bimetal-like warping of the product in cases where the layers aren't oriented in the same direction. Such a warping will most certainly increase as the product ages.

The post-shrinking of different parts is of the same reason controlled so that all parts included in one and the same load carrier is in mainly the same degree of contraction This can be achieved in different ways One way is to allow the work pieces to shrink so that at least 75% of the total contraction is obtained. This can be achieved by an intermediate storing of the parts from a couple of hours to a couple of days before the next step in the process is started. It is here important that the different parts has the same degree of contraction.

The contraction can be accelerated by letting the intermediate storing take place in an elevated temperature, for example 60–100° C. The later will also give the advantage that the heating will be less time consuming when for example moulding the deck members. An accelerated contraction might, however, be less suited before the final assembly as this will require some stability in the different parts. Another way to solve the contraction problem is to "freeze" the different parts directly after each step of the process which involves thermoforming. This is suitably achieved by rapidly cooling the parts to below room temperature immediately after the moulding. The contraction will then stop almost completely and will not commence until the parts are heated.

It is also possible to mould and assemble all parts at predetermined junctures in the beginning of the contraction, for example when only 5–10% of the total contraction is obtained. The moulding of the deck members can for example take place 1 minute ±5 seconds and the welding 5 minutes ±10 seconds, after the extrusion of the work pieces.

The bar sections, which in the finished load carrier constitutes skids, are suitably massive. These bar sections are milled to the desired dimensions after cooling and post-shrinking, but before the assembly, whereby undesired cross-warping in the skid can be avoided.

These skids are alternatively hollow, extruded, profiles which preferably after cooling and post-shrinking and possibly before assembly is sealed at its both ends by means of plugs or by being thermoformed. The skid may according to yet another alternative be manufactured in the same manner as the deck members whereby it comprises an upper and a lower layer The upper layer is preferably connected with the lower layer via distance sections The distance sections forms an integrated part of either or both of the layers and are moulded together with the moulding of the respective layers.

The thermoplastic material used for manufacturing is preferably a polymer, for example polyethylene, polypropylene or polybutene with an average molecular weight in the range 200,000–2,000,000 preferably greater than 300,000. It is, in certain cases, as for example when moulding parts with thinner material thickness advantageous to use a material with the molecular weight in the range 1,000,00–2,000,000, while thicker parts most often are produced of a material with a molecular weight in the range 300,000–1,000,000.

The deck members are preferably provided with mainly vertical surfaces and mainly horizontal surfaces, whereby the joining surfaces are arranged on horizontal surfaces. Vertical surfaces are further arranged adjacent to, or envelopes said joining surfaces. The joining surfaces suitably has a goods thickness which is greater than the goods thickness of the sections located adjacent to the joining surfaces.

The upper deck member and the lower deck member are each constituted of an upper layer and a lower layer, which upper layers preferably are connected with its respective lower layer via distance sections. These distance sections constitutes an integrated part of the respective layer and are moulded in connection to the moulding of the respective layers. It is suitable to join the two surfaces when larger flat surfaces are present by joining them with one another by means of tower- or ridge-like elevations This will increase the rigidity and at the same time improve the dimension stability.

The different parts are preferably joined with each other by means of welding such as mirror welding, laser welding, friction welding and or filler rod welding.

Mirror welding is performed by heating two surfaces of thermoplastic material until it melts. The heating is performed by means of a so called weld core which is a plate made of metal. The heated thermoplastic surfaces are then pressed together while the molten material is allowed to cool.

When laser welding, one of the layers is at least somewhat translucent while the other one is opaque, most often by adding carbon black to the thermoplastic material. The two layers are pressed together whereby the surfaces to be joined are illuminated with a laser. The illumination is performed from the translucent side. The energy from the laser beam will be transformed into thermal energy when it hits the opaque layer whereby it melts and the parts are joined by welding.

When friction welding, the surfaces to be joined are rubbed against each other so that the material melts due to the friction heat. Commonly known friction welding methods are ultrasonic welding, low frequency welding and rotation welding.

Welding with filler rod in thermoplastic materials is similar to its metal counterpart The joining surface and the filler rod, which are made of the same thermoplastic material are heated with a so-called hot air insulator. The filler rod is pressed into the joint while the hot air beam is slowly moved along the joint This method may also be used as a complement in combination with the ones mentioned above.

Predetermined surfaces on the load carrier is suitably coated with friction enhancing material. The surfaces to be coated are suitably pre-treated by flame or corona treating whereupon the surface is spray coated with the friction enhancing material. The friction enhancing material comprises, for example, ethyl-vinyl-acetate or the combination polyurea-prepolyrner and diisocynate. The friction coating is suitably performed after the joining of the different parts of the load carrier. The parts partly or completely coated are;

the upper side of the upper deck member, the lower parts of the bar sections, and selected parts of the lower side of the lower deck member.

The process according to the present invention is suited for the manufacturing of pallets where the demands for mechanical stability are very high and where reinforcing profiles or additives are banished due to hygienic or environmental reasons. The process may also be used for other types or load carriers such as foldable or solid pallet containers and bulk containers.

The invention is illustrated further through a process scheme and through an enclosed FIGURE which shows one embodiment of the invention whereby, The figure shows a process for the manufacturing of an embodiment of a load carrier 1 with an upper deck member 11, a lower deck member 12 and a skid 3'.

shown) with a mainly rectangular cross-section are also produced by means of an extruder. The bar sections are also allowed to cool and post-shrink for about 12 hours.

An upper deck member 11 is then produced by first heating and then moulding two of the sheet-shaped work pieces 2 in a first mould. The mould comprises a first and a second mould half, which mould halves comprises each one shaping cavity. The two shaping cavities are together a negative representation of an upper deck member 11 to a load carrier 1The mould halves are arranged so that an intermediate space is formed between them and that the

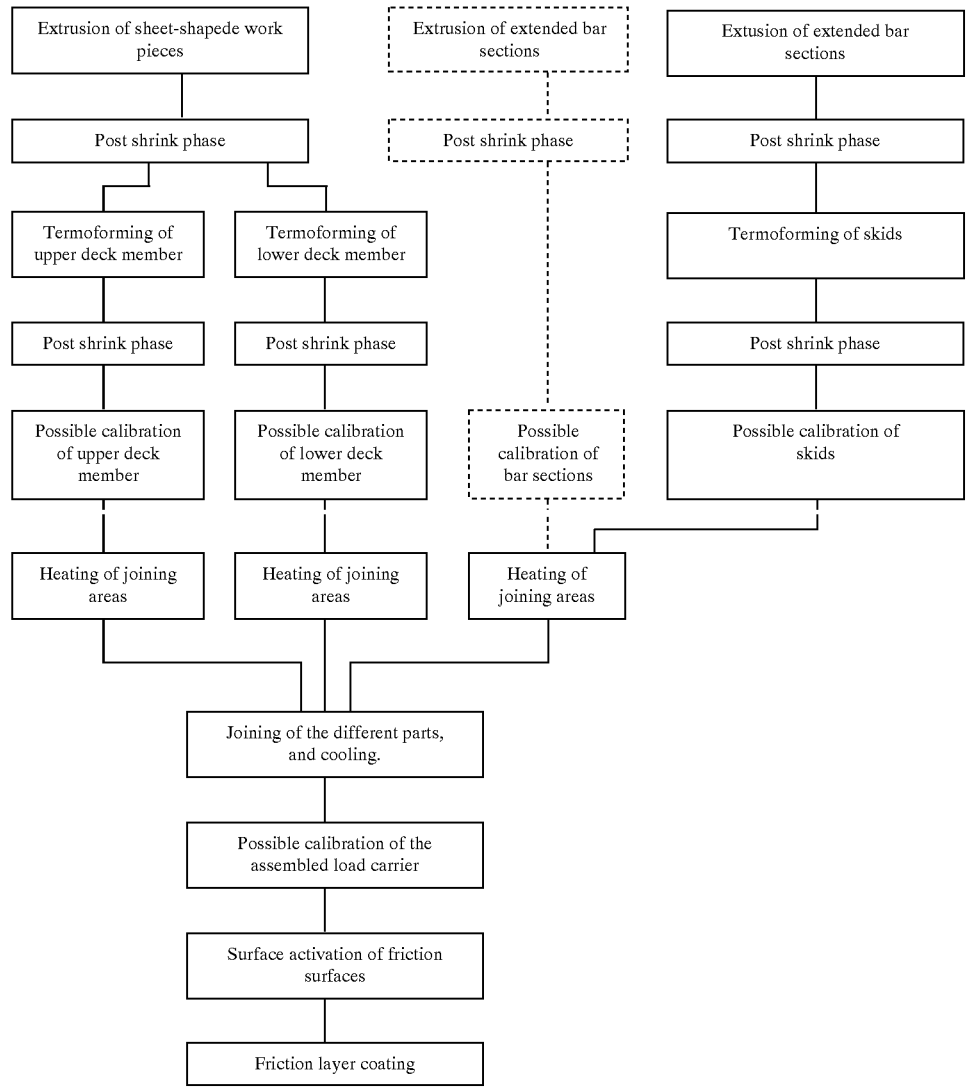

Process scheme

Accordingly, FIG. 1 shows a load carrier with an upper deck member 11 a lower deck member 12 and skids 3'. Only parts of the load carrier 1 is shown on order to facilitate understanding of the invention. Parts has furthermore been cut off in order to illustrate the process. The process scheme shows in steps, the different main events in the manufacturing process The process is initiated by producing sheet-shaped work pieces 2 by means of an extruder. The sheet-shaped work pieces (not shown) are allowed to cool and post-shrink for about 12 hours. Extended bar sections 3 (not cavities are facing each other, The two heated work pieces (not shown) are hereby placed in the intermediate space between the two cavities after which they are shaped by one cavity each under influence of vacuum and/or pressure whereupon the mould halves are pressed together while the thermoplastic material is still hot so that the two work pieces are welded with each other and forms a hollow unit, A tube can be inserted between the two layers before they are joined. Compressed air is then injected through the tube once the two layers are joined. It will hereby be possible to more accurately mould the part, especially in sharp corners and transitions. The thermoplastic material is then allowed to cool somewhat before the mould is opened. The upper deck member 11 is then removed and the process can be repeated.

A lower deck member 12 is also manufactured by heating and then moulding two further work pieces 2, which after heating is moulded in a second mould. This second mould comprises a first and a second mould half, which mould halves each comprises one shaping cavity. The two cavities are together a negative representation of a lower deck member 12 to a load carrier 1. The two heated work pieces are placed, shaped, welded and removed in a manner similar to the manufacturing of the upper deck member 11. It is, of course possible to mould the two deck members 11 and 12 respectively completely independent of each other A skid 3' is furthermore manufactured by first heating and then moulding two of the extended bar sections 3 (not shown) in a third mould This mould comprises a first and a second mould half. The mould halves includes each one shaping cavity, which cavities together are a negative representation of a skid 3' to a load carrier 1 The two extended heated bar sections 3 are placed, moulded and welded in a manner similar to the manufacturing of the deck members 11 and 12 above. It is of course possible to mould the skid 3' as well as the deck members 11 and 12 completely independent of each other The sheet-shaped work pieces 2 are oriented so that the direction of the extrusion coincides between the layers that forms the parts. The reason to this is that the contraction of the thermoplastic material is depending on the direction of the polymer chains. These polymer chains will be oriented in connection to the extrusion. Even if the main part of the contraction will take place within a couple of days, some additional contraction will occur during the main part of the useful life of the product This contraction will be accelerated when the product is exposed to increased temperatures, such as for example during washing and drying. This contraction might cause warping of the product in cases where the layers aren't oriented in the same direction. Such a warping will most certainly increase as the product ages.

The upper deck member 11, the lower deck member 12 and the skid 3' is allowed to cool and post-shrink for 8 hours after being removed from the moulds. The upper deck member 11 and the lower deck member 12 are each constituted by upper layers 11' and 12' respectively and lower layer 11" and 12" respectively. The upper layers 11' and 12' respectively are connected to their respective lower layer via distance sections 11'" and 12'" respectively. The distance sections 11'" and 12'" respectively constitutes an integrated part of the respective layer 11', 11" and 12'. 12" respectively and are moulded together with the moulding of the respective layer 11', 11" and 12', 12" respectively. The skid 3' is also provided with distance sections as above according to the enclosed embodiment.

The deck members 11 and 12 respectively, and the skids 3' are provided with a number of joining areas 10 in connection to the moulding. These are arranged on the lower side of the upper deck member 11, on the upper and lower side of the lower deck member 12 and on the upper side of the skids 3'. The joining areas 10 arc arranged in connection to, or enveloped by mainly vertical surfaces. The risk for a collapse in the different parts during welding are thereby reduced. The joining areas 10 are of the same reason provided with goods thickness greater than the parts located adjacent to the joining areas 10. The joining areas 10 are heated by, being pressed against a heated weld core. The different parts are thereafter pressed against each other so that the molten thermoplastic material of the lower joining area 10 of the upper deck member 11 and the upper joining area 10 of the lower deck member 12 welds with each other and that the lower joining area 10 of the lower deck member 12 welds with the upper joining area 10 of the skid 3'. The thermoplastic material in the joining area 10 is then allowed to cool and solidify, at least somewhat, before the pressing cycle is terminated, whereby a joined non-reinforced load carrier 1 of thermoplastic material is achieved.

The different joining operations may result in that burrs forms along the joining lines of the load carrier 1. The burrs are suitably removed in one or more operations by means of thermal or mechanical treatment. This operation may become necessary after manufacturing of the different parts 11, 12 and 3' and after the final assembly.

The load carrier 1 according to the present embodiment is manufactured of a polyolefin, most often polyethylene. The friction coefficient of this material is rather low which may result in problems when using the same Predetermined surfaces of the load carrier 1 is therefore coated with a friction enhancing material after the assembly The surfaces that is to be coated are first flame or corona treated and thereafter spray coated with the friction enhancing material. The friction enhancing material is comprises a combination of a polyureaprepolymer and diisocynate. The surfaces coated are;

the upper side of the upper deck member 11, the lower sides of the skids 3' and, selected parts of the lower side of the lower deck member 12.

The invention is not limited to the embodiment shown since it can be varied in different ways within the scope of the invention. Skids 3' may for example be constituted of a massive or hollow extruder profile, which also is illustrated in the process scheme This alternative manufacturing process for skids 3' is, in the process scheme marked with dashed lines. The step where the skid 3' is vacuum moulded may then be excluded from the process. It may however be necessary to calibrate the outer dimensions of the skid 3' after the post-shrink phase.

It is also possible to provide the load carrier with a friction enhancing coating earlier in the process. It is, for example, possible to coat the sheet-shaped work pieces 2 as well as the extended bar sections 3 already after the extrusion. This might prove advantageous as the following treatment may improve the adhesion between the friction coating and the different load carrier parts.

What is claimed is:

1. Process for the manufacturing of non-reinforced load carriers of thermoplastic material, the process comprising:

a i) extruding work pieces in the shape of sheets and allowing the extruded work pieces to cool and post shrink uniformly after the extruding during and intermediate storing of at least a couple of hours;

ii) extruding extended bar sections, the bar sections optionally having a rectangular or polygonal cross-section, and allowing the extruded bar sections to cool and post shrink uniformly after the extruding, during an intermediate storing of at least a couple of hours; whereupon, b i) forming an upper deck member by heating, followed by molding, two uniformly post shrunk work pieces in a first mold, the first mold comprising a first and a second mold half, which mold halves each comprise one shaping cavity, which shaping cavities together are a negative representation of an upper deck member of a load carrier whereby the mold halves are arranged so that an intermediate space is formed between them and that the cavities are facing each other, whereupon the two heated work pieces are placed in the intermediate space between the two cavities after which each work piece is under influence of vacuum and/or pressure whereupon the mold halves are pressed together while the thermoplastic material is still hot so that the two work pieces are welded with each other and form a hollow unit whereupon the thermoplastic material is allowed to cool somewhat before the mold is opened, the upper deck member is removed and the process can be repeated;

ii) forming a lower deck member, by heating and then molding two further, also post shrunk, work pieces, which after heating is formed in a second mold comprising a first and a second mold half, which mold halves each comprises one shaping cavity, which two cavities together is a negative representation of a lower deck member of a load carrier, whereby the two heated work pieces are placed, molded, welded and removed in the same manner as the forming of the upper deck member; and optionally, iii) forming a skid by heating and then forming two extended bar sections in a third mold comprising a first and a second mold half comprising a first and a second mold half, which mold halves each comprise one shaping cavity, which two cavities together is a negative representation of a skid of a load carrier, whereby the two heated bar sections are placed, molded, welded and removed in the same manner as the manufacturing of the deck members; whereupon, c) the upper deck member and the lower deck member are allowed to cool and post shrink uniformly, after being removed from the respective molds during an intermediate storing of at least a couple of hours; whereupon, d) heating a number of joining surfaces on a lower side of upper deck member, on upper and lower sides of the lower deck member and on an upper side of two or three bar sections or alternatively two or three skids, which, in one or more steps, are heated by means of infrared heating, laser or by being pressed against a heated weld core, whereby the different parts, in one or more steps, are pressed together so that the thermoplastic material in the lower joining surfaces of the upper deck member and on the upper and lower joining surfaces of the lower deck member as well as the joining surfaces of the bar sections or the skids form weld or melt joints, whereafter the thermoplastic material in the joining surfaces is allowed to cool and solidify at least partly before the pressing is discontinued, whereby a joined, non-reinforced load carrier of thermoplastic material is achieved; and optionally e) coating predetermined surfaces on the load carrier with a friction enhancing material by flame or corona treating the surface to be coated after the extrusion of the work pieces or extended bar section, respectively, or after the joining whereupon the surface is spray coated with the friction enhancing material.

2. A process according to claim 1, wherein the thermoplastic material comprises a polymer with an average molecular weight in the range of 200,000–2,000,000.

3. A process according to claim 2, wherein the thermoplastic material comprise a polymer with an average molecular weight greater than 300,000.

4. A process according to claim 1, wherein the deck members are provided with mainly vertical surfaces and mainly horizontal surfaces, whereby the joining surfaces are arranged on horizontal surfaces and that the vertical surfaces are arranged adjacent to, or enveloping said joining surfaces.

5. A process according to claim 4, wherein the joining surfaces have a thickness which is greater than a thickness of sections located adjacent to the joining surfaces.

6. A process according to claim 1, further comprising milling the bar sections, after cooling and post-shrinking but before joining, to desired predetermined dimensions.

7. A process according to claim 1, wherein the bar sections in the finished load carrier and hollow extruded profiles and further comprising sealing the bar sections at both ends by means of plugs or by being thermoformed.

8. A process according to claim 1, wherein the coating is performed after the joining of the different parts of the load carrier, whereby the parts partly or completely coated are, the upper side of the upper deck member, the lower parts of the bar sections and selected parts of the lower side of the lower deck member.

9. A process according to claim 1, wherein the two sheet shaped work pieces of at least one of the upper and lower deck members are oriented so that their directions of extrusion coincide.

10. A process according to claim 1, wherein the extended bar sections or profiles are oriented so that the direction of extrusion coincides with the direction of extrusion of at least one other part of the load carrier.

11. A process according to claim 10, wherein the extended bar sections or profiles are oriented so that the direction of extrusion coincides with the direction of extrusion of the other extruded parts of the load carrier.

12. A process according to claim 1, wherein the thermoplastic material is selected from the group consisting of polyethylene, polypropylene and polybutene.

13. A process according to claim 1, comprising step (e).

14. A process according to claim 1, wherein the intermediate storing of step c) is 6–24 hours.

15. A process according to claim 1, wherein the intermediate storing of at least one of steps a i) and a ii) is 6–48 hours.

16. A process according to claim 1, wherein the intermediate storing of at least one of steps a i), a ii), and c) is sufficient to achieve at least 75% of the total contraction.

* * * * *